United States Patent Office

3,352,300
Patented Nov. 14, 1967

3,352,300
CARDIAC MONITOR
Fred A. Rose, 202 N. Paterson, Madison, Wis. 53703
Filed Oct. 28, 1964, Ser. No. 407,022
21 Claims. (Cl. 128—2.06)

ABSTRACT OF THE DISCLOSURE

A cardiac monitor is disclosed which detects cardiac arrythmias by measuring the duration of that portion of a patient's R-wave which exceeds in amplitude the other components of his electrocardiac signal. A capacitor is charged when the patient's cardiac signal exceeds a predetermined level, that level being chosen so that normally it is exceeded only by the cardiac R-wave. The capacitor voltage is sensed in relation to a preselected level or threshold and, when each of a succession of cardiac waves causes the capacitor voltage to exceed that preselected level, an alarm signal is initiated.

---

This invention relates to a cardiac monitor and more particularly to such a monitor which will automatically provide an alarm signal if certain irregularities occur in a patient's electrocardiac signal. The invention further relates to a method of detecting cardiac arrythmias.

Cardiac monitors have been known heretofore which provide an alarm signal if a patient's pulse rate falls below or rises above certain predetermined limits. However, the pulse rate can vary over a considerable range from entirely ordinary causes which would not require immediate medical treatment. Thus these prior art systems may often give false indications of cardiac malfunction. Further, there exist forms of cardiac arrythmias which may themselves require immediate treatment or are indicative of approaching more serious conditions and yet will not be sensed by these prior art systems.

Among the several objects of the present invention may be noted the provision of an automatic cardiac monitor which is highly sensitive to dangerous cardiac arrythmias and yet is relatively insensitive to normal fluctuations in pulse rate; the provision of such a monitor which will automatically provide an alarm signal when certain irregularities occur in a patient's electro-cardiac signal so that continuous observation of the monitor by a human attendant is not required; the provision of a cardiac monitor which is adaptable to a central alarm system for hospital use so that a plurality of patients can be monitored simultaneously; and the provision of such a monitor which is highly reliable and yet relatively inexpensive so that multiple installations are feasible for hospital intensive care units. Other objects and features will be in part apparent and in part pointed out hereinafter.

The present invention operates by determining whether or not the patient's cardiac R-wave is of normal duration. If the pulse rate varies due to ordinary causes not indicative of a trauma, the R-wave will remain of substantially constant period. On the other hand, any of a large variety of cardiac arrythmias will produce detectable changes in the duration of the R-wave. For example, in ventricular fibrillation the cardiac signal exhibits a rapid and somewhat random succession of long pulses. Further, even before fibrillation begins, the conditions which produce fibrillation may cause a substantial lengthening or broadening of the R-wave in an otherwise normal ventricular wave complex. Extrasystoles caused by irritations of the heart produce relatively long electrical pulsations and ventricular tachycardia produces an electrocardiac signal which, when displayed, looks like a series of broad but rapidly repeated R-waves.

In sensing the duration of the R-wave, the apparatus of this invention initially isolates the R-wave by passing an amplified electrocardiac signal into a level discriminator for detecting when the cardiac signal exceeds a predetermined level. The predetermined level is chosen so that normally it is exceeded only by the R-wave. The discriminator provides a first signal in the interval during which the cardiac signal exceeds the predetermined level.

A pulse width detector, controlled by said first signal, measures the duration of the R-wave and provides a second signal each time the measured duration exceeds a predetermined period. In the preferred embodiment these second signals are counted and a small minimum number of such irregularities are permitted before the alarm signal is initiated. Preferably also, the counting or integration of said second signals is done on a time-weighted basis so that irregularities occurring at widely spaced intervals will not initiate the alarm.

The invention accordingly comprises the apparatus and methods hereinafter described, the scope of the invention being indicated in the following claims.

In the accompanying drawings, in which one of various possible embodiments of the invention is illustrated, FIG. 1 is a block diagram illustrating functionally the major components of an automatic cardiac monitor;

Corresponding reference characters indicate corresponding parts throughout the several views of the drawings.

Figure 1:
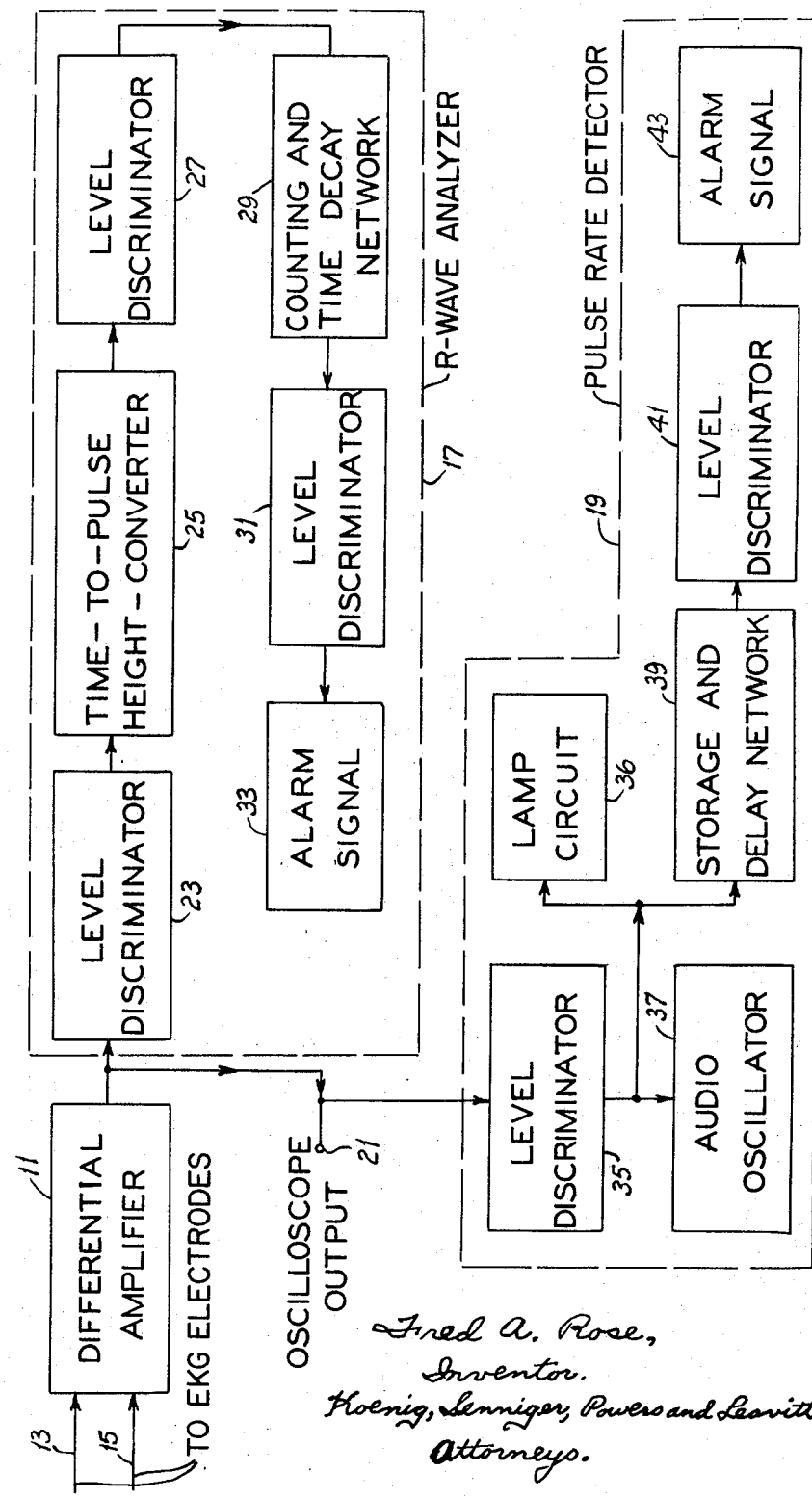

Referring now to FIG. 1, an electrocardiac signal, which may be conventionally obtained by EKG electrodes placed on a patient's body, is applied to a differential amplifier 11 at balanced input terminals 13 and 15. The amplified cardiac signal from amplifier 11 is applied to an R-wave analyzer section 17, a pulse rate detection section 19 and an oscilloscope output terminal 21. A conventional lag screen oscilloscope connected to the terminal 21 will aid in placing the EKG electrodes so that a strong electrocardiac signal is obtained.

In R-wave analyzer section 17 the amplified cardiac signal is first applied to a level discriminator 23 for detecting when the cardiac signal exceeds a predetermined level. This predetermined level is chosen so that normally it is exceeded only by the cardiac R-wave and thus other portions of the cardiac signal and incidental noise will not trigger discriminator 23.

Discriminator 23 provides an output signal which is coupled to a time-to-pulse height converter 25. Converter 25 is operative to measure the duration of the R-wave and to provide a signal whose amplitude is substantially proportional to this duration. This signal is applied to a second level discriminator 27 which is operative to detect when the signal from converter 25 rises above a predetermined amplitude. This predetermined amplitude is an analog of a preselected R-wave duration which is taken as normal. Discriminator 27 provides an output signal each time the predetermined amplitude is exceeded. These output signals are coupled into a counting and time-decay network 29 which is operative to count or integrate the output signals from discriminator 27 and to provide a signal which is a time-decaying function of the count. The time-decaying signal is in turn coupled into a third level-discriminator 31 which initiates operation of an alarm signal 33 when the time-decaying signal exceeds a predetermined threshold. Thus, if the duration of each of a succession of R-waves exceeds the pre-selected period determined by the setting of discriminator 27, the alarm signal 33 will be activated so that corrective treatment can be instituted.

As indicated previously, the amplified cardiac signal from the amplifier 11 is also fed into a pulse rate detector section 19. In detecting the pulse rate, this apparatus again employs the R-wave portion of the ventricular wave complex. The amplified cardiac wave is applied first to a level discriminator 35 which detects when the cardiac signal exceeds a predetermined level, the level again being chosen so that normally it is exceeded only by the cardiac R-wave. Discriminator 35 controls directly a lamp circuit 36 and an audio oscillator 37 so that audible and visual indications of heartbeat are provided synchronously with the R-wave.

The output signal from discriminator 35 is also applied to charge a storage and delay network 39. Network 39 charges quickly to a peak value when R-waves are present and discharges relatively slowly when R-waves are not present. A level discriminator 41 detects the charge present in network 39 and, when this charge falls below a preselected value, the discriminator energizes an alarm signal 43. The discharge time constant is preferably greater than a plurality of normal heartbeat intervals, e.g. four, and discriminator 41 is adjusted so that a period equal to a plurality of heartbeats can pass without an R-wave before the alarm signal is given. Thus a cardiac arrest which causes a cesation of R-waves will trigger alarm signal 43 after a short delay.

From the above description it will be apparent to those skilled in the art that in operation this system continuously provides audible and visual indications of heartbeat by means of the audio oscillator 37 and lamp 36 respectively. If heartbeats should cease for longer than a preselected interval, the alarm signal 43 is energized and if cardiac arrythmias producing long pulses are encountered, the alarm signal 33 is initiated.

Figure 2:
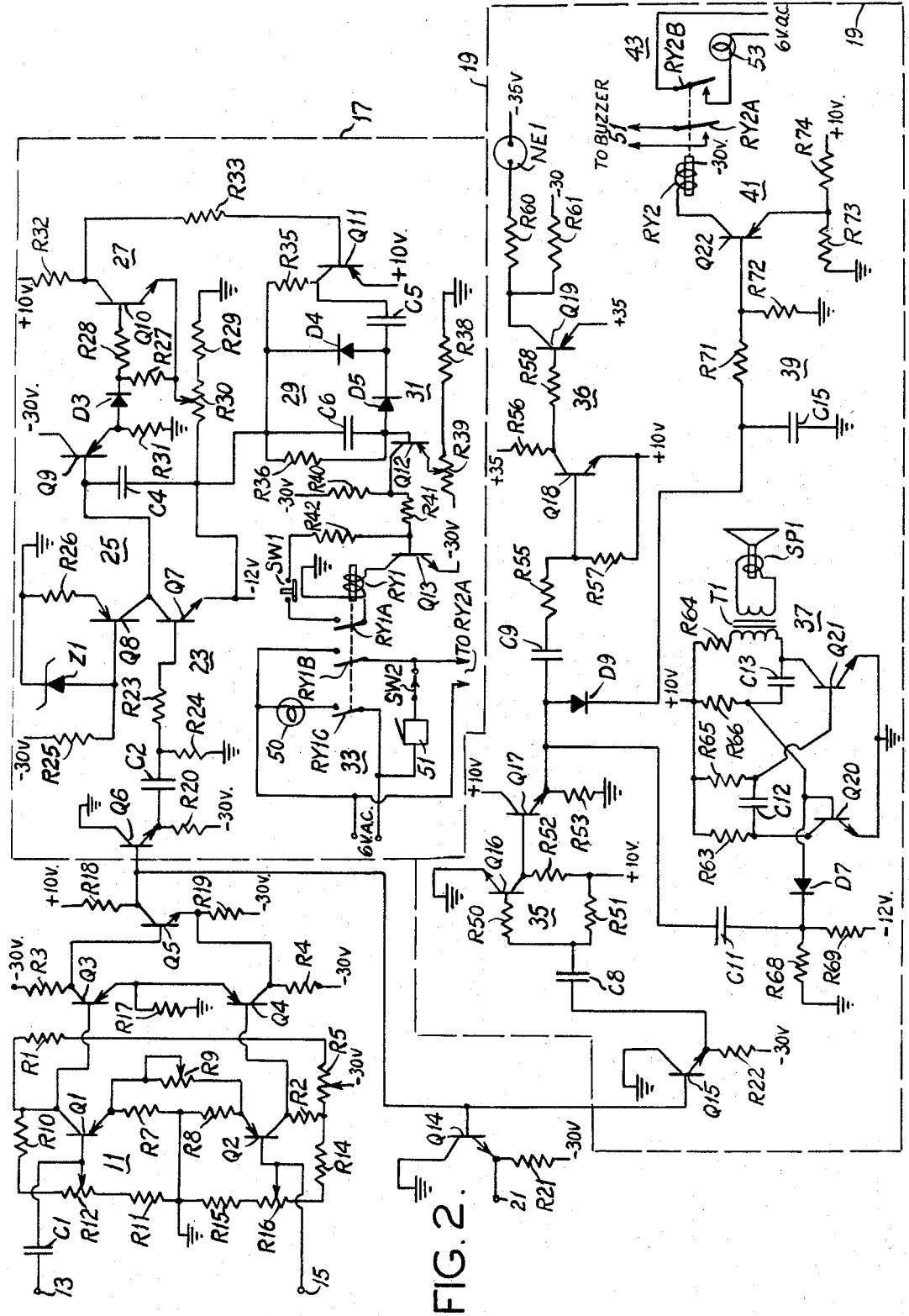
FIG. 2 is a schematic circuit diagram of the FIG. 1 system.

FIG. 2 illustrates the individual components which make up the FIG. 1 system and their interconnection. Electric power is supplied to the circuit at the various potentials and polarities indicated at respective terminals. The EKG electrode leads 13 and 15 are connected to the base terminals of a pair of PNP transistors Q1 and Q2. A capacitor C1 is interposed in the lead 13 for D.C. isolation. Transistors Q1 and Q2 are connected in circuit with a second pair of PNP transistors Q3 and Q4 as a cascade differential amplifier. Resistors R1–R4 are the collector circuit load resistors for transistors Q1–Q4 respectively. Resistors R3 and R4 are connected directly to a —30 volt source while resistors R1 and R2 are connected to this source through the opposite sides of a potentiometer R5. The potentiometer R5 permits adjustment of D.C. balance.

A pair of resistors R7 and R8 in the emitter leads of transistors Q1 and Q2 respectively tend to provide degeneration of both in-phase and out-of-phase signals applied to the leads 13 and 15. However, a rheostat R9 linking the two emitters can increase the gain with respect to out-of-phase signals by making a portion of the resistance common to the two emitter circuits. It should be noted that this rheostat affords a continuous adjustment of gain with respect to out-of-phase signals while introducing virtually no D.C. unbalance. An adjustable amount of negative feedback is obtained around transistor Q1 by a voltage divider network including resistors R10 and R11 and a potentiometer R12. A similar network involving resistors R14 and R15 and a potentiometer R16 provides negative feedback around the transistor Q2.

The collectors of transistors Q1 and Q2 are directly coupled to the base terminals of transistors Q3 and Q4 respectively. A common emitter swamping resistor R17 causes this stage to exhibit high gain with respect to out-of-phase signals and very low gain with respect to in-phase signals.

The use of differential amplification in electrocardiography is highly desirable for the reason that the EKG signal may be quite small, for example in the order of one millivolt, while the background noise and power line interference may be relatively large, for example 200 millivolts. However, the EKG signal is out-of-phase at different points on the patient's body while the background noise and particularly power line interference tend to be in-phase at all points on the body. Accordingly, the signal components may be separated in a differential amplifier which has a much higher gain for out-of-phase signals than it does for in-phase signals. An amplifier, such as that illustrated employing transistors Q1–Q4, can be constructed having a gain of 5,000 for out-of-phase signals and yet a gain of only 0.10 for in-phase signals.

Differential amplifier 11 is provided with a single-ended output by coupling the push-pull output signals, available from the collectors of transistors Q3 and Q4, directly to the base and emitter respectively of an NPN transistor Q5. The load resistance for transistor Q5 is divided between resistors R18 and R19 in the collector and emitter leads thereof respectively. The single-ended output signal is taken from the collector of transistor Q5 and, to prevent loading and interaction between the circuits described hereinafter, is fed through three similar emitter-follower circuits involving NPN transistors Q6, Q14 and Q15, each of which is provided with a respective emitter load resistor R20, R21 and R22.

The emitter of transistor Q14 is connected to an oscilloscope output terminal 21 so that the EKG signal can be observed and the electrodes positioned for greatest effectiveness as described above. The oscilloscope connection is of course also useful in making a diagnosis of any arrythmia detected by the apparatus.

At this point is should be noted that the apparatus illustrated is so arranged that, for proper operation, the amplified cardiac wave provided at the emitter follower transistors Q6, Q14 and Q15 should be of such polarity that the R-wave is negative going. This is of course easily accomplished by the proper choice of connections of the EKG electrodes to the respective leads 13 and 15.

Figure 3A:
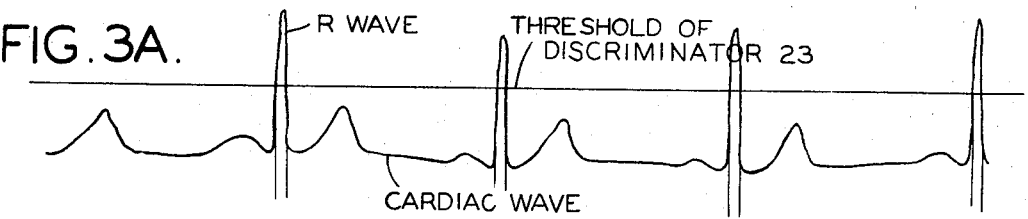
FIGS. 3 and 4 are representations of various waveforms useful in explaining the operation of the circuit of FIG. 2.

The emitter of transistor Q6 is coupled, through a capacitor C2 and a current limiting resistor R23, to the base of an NPN transistor Q7 which is operated as discriminator 23. Transistor Q7 is normally forward biased by current drawn through the resistor R24 and can be cut off only by a negative signal of sufficient magnitude to overcome this bias current. The bias current level is chosen so that normally it is overcome or exceeded only by the R-wave portion of the amplified cardiac signal. A normal cardiac signal is illustrated in FIG. 3A in relation to the threshold of discriminator 23. As may be seen, the R-wave exceeds the threshold for a relatively short time.

PNP transistor Q8 is provided at its base terminal with a constant voltage drive by a zener diode Z1. The zener diode and the base-emitter circuit of transistor Q8 are provided with bias current through a resistor R25. A resistor R26 in the emitter circuit of transistor Q8 degenerates its amplifying action thereby causing the collector circuit to exhibit a very high source impedance and to function virtually as a constant current source. The value of the current flow is determined by the value of resistor R26. This constant current source supplies current to the collector-emitter circuit of the discriminator transistor Q7 and to a timing capacitor C4 connected in parallel therewith. As transistor Q7 is normally in a conductive state, as described above, capacitor C4 is normally discharged and the constant current from transistor Q8 flows solely into the collector of transistor Q7. When, however, transistor Q7 is cut off by a negative pulse applied to its base circuit, the constant current source will charge the capacitor C4 so that capacitor voltage rises linearly with time. This combination thus provides a time-to-pulse height conversion.

The voltage on capacitor C4 is applied, through an emitter follower stage involving PNP transistor Q9, a diode D3, and a current limiting resistor R28, to the base terminal of an NPN transistor Q10 which is operated as level discriminator 27. Resistor R27 shunts any leakage currents and insures that transistor Q10 will be completely cut off when not forward biased by the capacitor voltage. Resistor R31 is the usual emitter follower load resistor for transistor Q9 and resistor R32 is the collector load for transistor Q10. Diode D3 isolates the discriminator transistor Q10 from the emitter follower transistor Q9 when the voltage on the capacitor C4 is less than that at the emitter of transistor Q10.

A voltage divider, including resistor R29 and potentiometer R30, allows the emitter of transistor Q10 to be held at a preselected voltage. The transistor Q10 will thus be cut off when the voltage on capacitor C4 is less than the preselected emitter voltage and will conduct only if the capacitor voltage rises above the pre-selected emitter voltage. Since the voltage on capacitor C4 is a linear function of time, the preselected voltage at the emitter of discriminaor transistor Q10 establishes a predetermined period of charging which must be exceeded before transistor Q10 will be turned on. If no R-waves exceed this period, transistor Q10 will remain cut off.

Figure 3B:
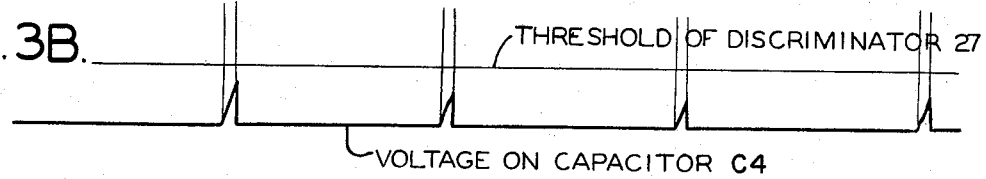
Figure 4A:
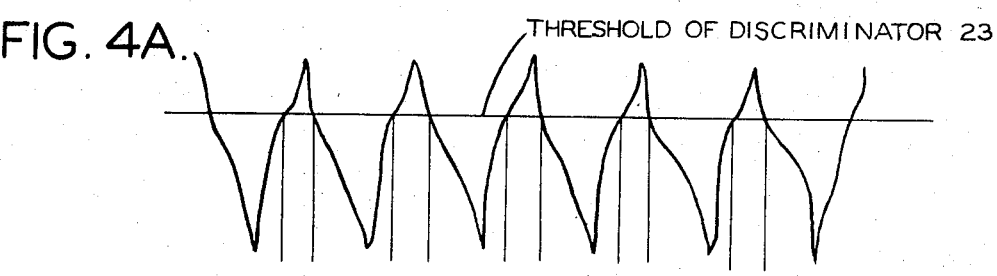
Figure 4B:
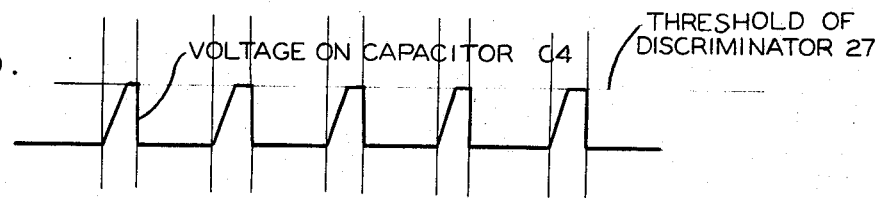

FIG. 3B illustrates the behavior of the voltage on capacitor C4 caused by the normal electrocardiac signal of FIG. 3A. It will be noted that the voltage on capacitor C4 rises linearly over the interval during which the cardiac signal exceeds the threshold of discriminator 23 but that this interval does not provide sufficient time for the capacitor voltage to exceed the threshold of discriminaor 27. If, however, the electrocardiac signal includes longer waves, such as the ventricular tachycardia signal shown in FIG. 4A, the voltage on capacitor C4 will reach the threshold of discriminator 27 as seen in FIG. 4B and transistor Q10 will conduct once for each long wave.

Figure 4C:
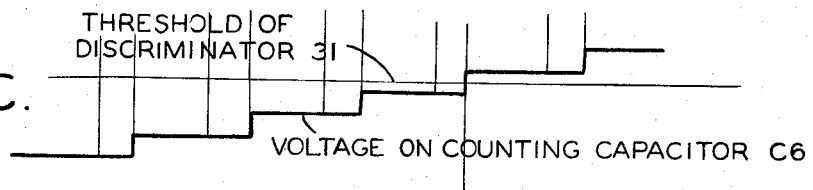

The collector of transistor Q10 is coupled, through a current limiting resistor R33, to the base terminal of a PNP transistor Q11. Since transistor Q11 is complementary in conductivity type to transistor Q10, Q11 will conduct when transistor Q10 conducts. Conduction in transisor Q11 will draw current through a load resistor R35 and will charge a transfer capacitor C5 through a diode D4. When transistor Q11 ceases to conduct, resistor R35 will tend to discharge capacitor C5. The discharge of capacitor C5 will reverse bias diode D4, thereby blocking conduction, and the discharge current will flow instead through a diode D5 thereby negatively charging a counting or integrating capacitor C6. Since capacitor C5 will nearly always be fully charged by each instance of conduction in the transistor Q11, a substantially fixed increment of charge will be transferred into the capacitor C6 each time transistor Q11 is turned off. Thus, the diode-capacitor network provides an effective means for counting the number of times transistors Q10 and Q11 are energized, the voltage on capacitor C6 being a function of the count. FIG. 4C is a representation of the stepwise buildup of voltage on capacitor C6 produced when the long waves of the ventricular tachycardia signal of FIG. 4A cause the voltage on capacitor C4 to repetitively exceed the threshold of discriminator 27. A resistor R36 shunting capacitor C6 gradually bleeds off the stored charge so that the voltage across the capacitor C6 is actually a time-decaying function of the count.

Figure 4D:
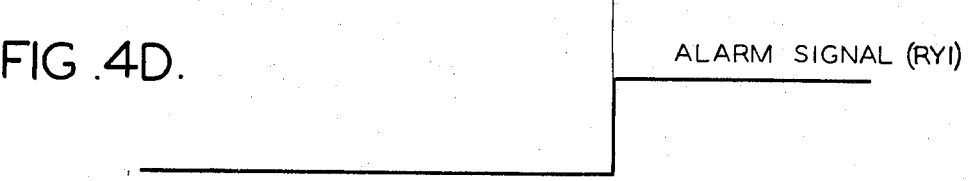

The voltage on the capacitor C6 is applied to the base terminal of PNP transistor Q12 which, together with its associated components, constitutes level discriminator 31. The collector circuit of the transistor Q12 is provided with a load resistor R40. A voltage divider, including a resistor R38 and a potentiometer R39, permits the emitter of transistor Q12 to be held at a preselected threshold voltage. The potentiometer R39 is normally adjusted so that the emitter voltage is more negative than the voltage on the capacitor C6 when it is discharged. Thus the transistor Q12 is normally cut off or non-conductive. However, when the transistors Q10 and Q11 are repeatedly energized and deenergized, a negative voltage is built up on the capacitor C6 faster than it is discharged by resistor R36 and the transistor Q12 will be turned on. The number of repetitions necessary to reach this threshold is determined by the relative values of capacitors C5 and C6 and the frequency at which these repetitions must occur is determined by the relative values of capacitor C6 and resistor R36. In FIG. 4C the threshold of discriminator 31 is shown as being set so that four consecutive waves of long duration will cause the voltage on capacitor C6 to exceed the threshold. The collector of transistor Q12 is coupled, through a current limiting resistor R41, to the base terminal of an NPN transistor Q13 which is a part of the alarm signal 33. Since transistor Q13 is of a conductivity type complementary to that of transistor Q12, transistor Q13 will be turned on when Q12 conducts. The collector circuit of transistor Q13 includes a relay coil RY1 which is thereby energized (FIG. 4D) when capacitor C6 is sufficiently charged. A set of contacts RY1A, controlled by coil RY1, are operative to forward bias the transistor Q13 through a current limiting resistor R42 when the relay is energized, thereby forming a holding circuit which will keep the relay energized once its operation is initiated. This holding circuit can be broken by opening a normally-closed switch SW1. Coil RY1 also operates normally-open contacts RY1C which control an indicator lamp 50 and normally-open contacts RY1B which control a buzzer 51. A switch SW2 in the buzzer circuit allows it to be shut off while the lamp 50 and relay RY1 are still energized. Buzzer 51 is also connected for energization by a pair of relay contacts RY2A as explained hereinafter.

The amplified cardiac signal available to the pulse rate detector section 19 from the emitter of transistor Q15 is applied, through a capacitor C8 and a current limiting resistor R50, to the base of an NPN transistor Q16 which is operated as a level discriminator. The discriminator detects when the cardiac signal exceeds a predetermined level and, as indicated previously, the predetermined level is chosen so that normally it is exceeded only by the cardiac R-wave. A resistor R51 provides current to the base of transistor Q16 normally biasing it into saturation. The collector of transistor Q16 is provided with a conventional load resistor R52 and is connected directly to the base terminal of an NPN transistor Q17 operating as an emitter follower with a conventional emitter load resistor R53. When transistor Q16 is in its normal condition of saturation, the voltage at the emitter of transistor Q17 will be close to ground potential. However when a cardiac R-wave momentarily cuts off transistor Q16, a positive going square wave will appear at the collector of transistor Q16 and at the emitter of transistor Q17, which square wave will have a period equal to the duration of the R-wave. This square wave controls the lamp circuit 36 and the audio oscillator 37 and also charges a storage and delay network 39.

In the lamp circuit 36 the square wave is coupled, through a D.C. blocking capacitor C9 and a current limiting resistor R55 to the base of an NPN transistor Q18. The transistor Q18 is operated as a current switch and is provided with a collector load resistor R56 and a base-emitter resistor R57 for shunting any leakage currents and assuring that transistor Q18 will be cut off when no square wave is applied. The collector of transistor Q18 is coupled through a current limiting resistor R58 to the base of a PNP transistor Q19. Being of a complementary conductivity type, the transistor Q19 is turned on along with transistor Q18. Transistor Q19 is a high voltage type for controlling a neon glow indicator lamp NE1 in its collector circuit. The collector circuit includes a series current-limiting resistor R60 and is shunted by a resistor R61 which assures that the lamp will be fully extinguished when no square wave is present.

The emitter of transistor Q17 is also coupled, through a capacitor C11 and a diode D7, to the base terminal of one (Q20) of a pair of NPN transistors Q20 and Q21 which are connected in a conventional multivibrator audio oscillator circuit 37. Resistors R63 and R64 are the conventional load resistors for transistors Q20 and Q21 respectively, capacitors C12 and C13 are the cross coupling capacitors, and resistors R65 and R66 are the bias and capacitor charging resistors. The collector circuit of transistor Q21 includes the primary winding of an audio output transformer T1 in series with the load resistor R64. A loud speaker SP1 is connected to the secondary winding of transformer T1.

The junction between capacitor C11 and diode D7 is normally maintained at a negative potential with respect to the emitters of transistors Q20 and Q21 by a voltage divider comprising a pair of resistors R68 and R69. This negative voltage is coupled through the diode D7 to the base of transistor Q20 thereby cutting it off and disabling the multivibrator. Disablement is, however, removed by a positive going pulse or square wave applied through the capacitor C11 from the discriminator 35 so that the multivibrator circuit will oscillate and provide an audio tone at the speaker SP1 simultaneously with each cardiac R-wave.

The positive going square waves available at the emitter of transistor Q17 are also employed to charge a storage capacitor C15 in network 39 through a blocking diode D9. Since the emitter follower transistor Q17 presents a relatively low source impedance, the capacitor C15 will be substantially fully charged by a single square wave pulse. Charge is gradually bled off from the capacitor C15 by a voltage divider comprising a pair of resistors R71 and R72. The junction between resistors R71 and R72 is connected to the base terminal of a PNP transistor Q22 which is operated as a level or voltage discriminator.

The emitter terminal of transistor Q22 is maintained at a predetermined potential by a voltage divider including a pair of resistors R73 and R74, the emitter being connected to the junction between the two resistors. The emitter voltage is chosen so that normally, that is when the capacitor C15 is fully charged, transistor Q22 will be reverse biased and nonconducting. However, if capacitor C15 discharges due to the absence of square waves at the emitter of transistor Q17, transistor Q22 will be forward biased after a preselected delay by current flowing through the resistor R72 and will be turned on. The collector circuit of transistor Q22 includes a relay control coil RY2. Coil RY2 operates two sets of normally-open contacts RY2A and RY2B. Contracts RY2B control an indicator lamp 53 while contacts RY2A control buzzer 51 concomitantly with relay contacts RY1B, described previously.

In summary, the operation of the system shown in FIG. 2 is as follows: An unamplified EKG signal, applied to the amplifier 11 through leads 13 and 15, is differentially amplified so that desired signal is strongly amplified while in-phase noise is suppressed. The amplified cardiac signal is made available at the emitters of three emitter follower transistors Q6, Q14 and Q15. The signal provided at the transistor Q14 is available for use with a lag screen oscilloscope to obtain a visual representation of the cardiac signal which may be useful in placing the electrodes for maximum effectiveness.

The amplified cardiac signal available from transistor Q15 is clipped in level discriminator transistor Q16 so that normally only the cardiac R-wave will produce a signal at the collector. The signal at the collector of transistor Q16 (and at the emitter of Q17) is essentially squared and is of duration equal to that of the normal R-wave. This square wave pulse is amplified in transistors Q18 and Q19 to flash neon lamp NE1 synchronously with the R-wave so that a visual indication of heartbeat is provided. The squared R-wave pulse also triggers the multivibrator audio oscillator circuit 37 to provide an audible tone at the speaker SP1 simultaneously with each cardiac R-wave so that an audible indication of heartbeat is also provided. Finally, the squared R-wave is employed to charge a storage capacitor C15 whose voltage is used as an indication of the presence of a heartbeat. The charge on the capacitor C15 is gradually bled off through resistors R71 and R72 and if the voltage on the capacitor falls below a preselected level, which can be chosen to occur after a preselectable number of missed heartbeats, buzzer 51 is energized and lamp 53 is lit providing an alarm signal indicating that there has been a cardiac arrest.

Besides merely detecting the presence of the R-wave to detect cardiac arrest, the invention also analyzes the duration of the R-wave to provide an alarm signal in case of certain other cardiac arrythmias in the following manner. The cardiac signal available at the emitter of transistor Q6 (FIG. 3A) is sensed by discriminator transistor Q7 at a predetermined level chosen so that normally only the cardiac R-wave produces a change or signal at the collector of transistor Q7. Transistor Q7 is normally forward biased and conductive so that the signal which controls charging of capacitor C4 is in fact the turning off of the transistor Q7. When transistor Q7 is cut off, the substantially constant current provided by the collector circuit of transistor Q8 flows into and charges the timing capacitor C4 so that its voltage rises linearly with time. The constant current source and capacitor C4 thus provide a time-to-pulse height conversion.

If the duration of the R-wave is not longer than a predetermined period so that the voltage on capacitor C4 does not rise above the preselected voltage at the emitter of transistor Q10, no signal will be produced at the collector of transistor Q10 and no increment of charge will be transferred through capacitor C5 into the counting or integrating capacitor C6. This is the normal situation (FIG. 3B).

If, however, the R-wave should lengthen so that its duration becomes greater than the preselected "normal" period (FIG. 4A), capacitor C4 will charge to a voltage which is sufficient to turn on transistor Q10 (FIG. 4B). Each R-wave which so triggers Q10 will cause the transistor Q11 to transfer or feed a substantially fixed increment of charge into capacitor C6 (FIG. 4C). If a predetermined succession of R-waves are of duration long enough to cause this charging, the voltage on capacitor C6 will rise above the threshold of discriminator transistor Q12 and cause it to provide an alarm signal (FIG. 4D) by energizing lamp 50 and buzzer 51 through transistor Q13 and relay RY1.

As stated previously, many dangerous types of cardiac arrythmias produce an electrocardiac signal exhibiting a broad pulsating wave form and thus will trip this monitor to provide an alarm signal. Since EKG electrodes are already attached to the patient, diagnosis of the particular arrythmia is facilitated by simply attaching an oscilloscope to the terminal 21 for observing the electrocardiac signal.

This invention, since it senses a highly reliable parameter to initiate an alarm signal, is well suited to remote monitoring. For example, in an intensive care ward for cardiac patients, the alarm signals may be relayed to a central monitoring area where a single observer attends a large number of monitors. The reliability of the present monitor makes such a system technically feasible and its relatively low cost makes the simultaneous use of a large number of units an economic practicality. In such a multiple system it is not necessary that an oscilloscope be provided for each monitor but rather one oscilloscope can typically serve for a large number of the monitors.

In view of the above, it will be seen that the several objects of the invention are achieved and other advantageous results attained.

While a particular construction has been illustrated, many equivalents will be apparent to those skilled in the art. For example, vacuum tubes or other amplifying devices can be employed in place of the transistors shown. Similarly, the conductivity types of the transistors can be interchanged and otherwise varied. Further functions may be combined and various electrical stages can be omitted or additional components can be included.

As various changes could be made in the above apparatus and methods without departing from the scope of the invention, it is intended that all matter contained in the above description or shown in the accompanying drawings shall be interpreted as illustrative and not in a limiting sense.

What is claimed is:

1. A cardiac monitor for indicating the occurrence of irregularities in a patient's electrocardiac signal comprising:
    means for sensing when said cardiac signal exceeds a predetermined level, said level being chosen so that normally it is exceeded only by the cardiac R-wave; a capacitor;
    means, responsive to said sensing means, for charging said capacitor when a cardiac wave exceeds said predetermined level;
    means, responsive to the voltage on said capacitor, for detecting when a cardiac wave exceeds said predetermined level for longer than a predetermined period; and
    means, responsive to said detecting means, for producing an alarm signal when each of a succession of cardiac waves exceeds said predetermined level for longer than said predetermined period whereby cardiac arrythmias producing long waves will initiate said alarm signal.

2. A monitor according to claim 1 including a differential amplifier for amplifying an electrocardiac signal obtained by electrodes placed on a patient's body and applying the amplified signal to the level sensing means whereby in-phase noise is rejected.

3. A monitor according to claim 2 further comprising means for applying the amplified electrocardiac signal to an oscilloscope.

4. A cardiac monitor for indicating the occurrence of irregularities in a patient's electrocardiac signal comprising:
    means for sensing when said cardiac signal exceeds a predetermined level, said level being chosen so that normally it is exceeded only by the cardiac R-wave;
    means, including a capacitor and a capacitor charging circuit which is controlled by said level sensing means and which is operated in a substantially constant current mode for charging said capacitor to a voltage which is a function of R-wave duration, for detecting when a cardiac wave exceeds said predetermined level for longer than a predetermined period; and
    means, responsive to said detecting means, for producing an alarm signal when each of a succession of cardiac waves exceeds said predetermined level for longer than said predetermined period whereby cardiac arrythmias producing long waves will initiate said alarm signal.

5. A monitor according to claim 4 in which the means for producing an alarm signal includes means for comparing capacitor voltage with a preselected voltage.

6. A monitor according to claim 1 further comprising means for providing an audio signal each time said cardiac signal exceeds a predetermined level thereby to provide an audible indication of heartbeat.

7. A monitor according to claim 1 further comprising means for providing a visual signal each time said cardiac signal exceeds a predetermined level thereby to provide a visual indication of heartbeat.

8. A monitor according to claim 4 further comprising a second means for detecting when said cardiac signal exceeds a second predetermined level; and
    means for providing an alarm signal when said cardiac signal fails to exceed said second predetermined level for longer than a preselected interval.

9. A cardiac monitor for detecting irregularities in a patient's electrocardiac signal comprising:
    means for providing a first signal when the cardiac signal exceeds a predetermined level, said level being chosen so that normally it is exceeded only by the cardiac R-wave;
    means for providing a second signal each time the duration of said first signal exceeds a predetermined period;
    means for counting said second signal and providing a time-decaying signal which is a function of the count; and
    means for providing an alarm signal when said time-decaying signal exceeds a predetermined threshold whereby cardiac arrythmias producing long pulses will initiate said alarm signal.

10. A monitor according to claim 9 in which said means for providing said second signal includes:
    a time-to-pulse height converter which is operative when said first signal is provided; and
    a level discriminator for producing said second signal when the pulse height exceeds a predetermined threshold.

11. A moinitor according to claim 9 in which the means for providing said first signal comprises a level discriminator circuit.

12. A monitor according to claim 9 in which said means for providing said second signal includes:
    a constant current source;
    a capacitor which is charged from said source; and
    a level discriminator circuit for comparing the capacitor voltage with a preselected voltage and providing said second signal each time said capacitor voltage exceeds said preselected voltage.

13. A monitor according to claim 12 in which said current source includes the collector circuit of a first transistor having a high output impedance for causing the capacitor voltage to rise substantially linearly with time.

14. A monitor according to claim 15 in which said means for providing a first signal includes a second transistor having an output circuit normally conducting said constant current, said output circuit shunting said capacitor, said second transistor being cut off when said cardiac signal exceeds said predetermined level thereby permitting said capacitor to charge.

15. A monitor according to claim 9 in which the means for counting said second signal includes a capacitor and means for adding a substantially fixed increment of charge to said capacitor each time said second signal is produced and in which said capacitor is shunted by a resistance for bleeding off charge whereby the occurrence of said second signal at widely spaced intervals will not cause said alarm signal to be initiated.

16. A monitor according to claim 9 further comprising:
    a holding circuit for continuing said alarm signal once it is initiated; and
    means for manually releasing said holding circuit to discontinue said alarm signal.

17. A monitor according to claim 9 further comprising a multivibrator audio oscillator and means for energizing said oscillator when said cardiac signal exceeds a predetermined level thereby to provide an audible indication of heartbeat.

18. A monitor according to claim 9 further comprising:
    means for providing a third signal when said cardiac signal exceeds a predetermined level;
    a capacitor;

means for charging said capacitor when said third signal is produced;
means for discharging said capacitor at a rate having a time constant substantially greater than a plurality of normal heartbeat intervals; and
means for producing an alarm signal when the capacitor voltage falls below a preselected level whereby cardiac arrest will cause the alarm signal to be produced.

19. A cardiac monitor for detecting irregularities in a patient's electrocardiac signal comprising:
means for providing a first signal when the cardiac signal exceeds a predetermined level, said level being chosen so that normally it is exceeded only by the cardiac R-wave;
means for providing a second signal when the duration of said first signal exceeds a predetermined period; and
means, responsive to a predetermined plurality of said second signal, for producing an alarm signal whereby cardiac arrythmias producing long pulses will initiate said alarm signal.

20. A monitor according to claim 19 in which said means for producing an alarm signal includes:
means for providing a signal which is a time-weighted integration function of said second signal; and
a discriminator providing said alarm signal when said integration signal exceeds a predetermined threshold.

21. A cardiac monitor for detecting irregularities in a patient's electrocardiac signal comprising:
a differential amplifier for amplifying an electrocardiac signal obtained from electrodes placed on a patient's body while rejecting in-phase noise;
a first level discriminator for providing a first signal when the amplified cardiac signal exceeds a predetermined level, said level being chosen so that normally it is exceeded only by the cardiac R-wave;
a timing capacitor;
a constant current source for charging said capacitor;
said first discriminator being interconnected in a circuit with said capacitor and said current source for shunting the constant current away from said capacitor except when said amplified cardiac signal exceeds said predetermined level;
a second level discriminator for providing a second signal each time the timing capacitor voltage exceeds a preselected value;
means for counting said second signal and providing a time-decaying signal which is a function of the count; and
a third level discriminator for providing an alarm signal when said time decaying signal exceeds a predetermined threshold, whereby cardiac arrythmias producing a succession of long pulses will initiate said alarm signal.

References Cited

UNITED STATES PATENTS

| | | | |
|---|---|---|---|
| 2,699,465 | 1/1955 | Hamilton | 128—2.06 X |
| 3,219,704 | 4/1964 | Burt | 128—2.1 |
| 3,144,018 | 8/1964 | Hera | 128—2.1 |
| 3,144,019 | 8/1964 | Heber | 128—2.06 |
| 3,215,136 | 11/1965 | Holter et al. | 128—2.06 |
| 3,267,933 | 8/1966 | Mills et al. | 128—2.06 |
| 3,267,934 | 8/1966 | Thornton | 128—2.06 |

RICHARD A. GAUDET, *Primary Examiner.*

SIMON BRODER, *Examiner.*